United States Patent
Park et al.

(10) Patent No.: US 8,599,300 B2
(45) Date of Patent: Dec. 3, 2013

(54) DIGITAL PHOTOGRAPHING APPARATUS AND CONTROL METHOD

(75) Inventors: Byeong-chan Park, Suwon-si (KR); Hyun-sik Yu, Suwon-si (KR); Sang-ryoon Son, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 49 days.

(21) Appl. No.: 13/238,704

(22) Filed: Sep. 21, 2011

(65) Prior Publication Data

US 2012/0113279 A1 May 10, 2012

(30) Foreign Application Priority Data

Nov. 4, 2010 (KR) .................. 10-2010-0109257

(51) Int. Cl.
*G02B 13/16* (2006.01)
*H04N 5/228* (2006.01)

(52) U.S. Cl.
USPC ..................................... 348/335; 348/208.99

(58) Field of Classification Search
USPC ........ 348/208.99, 208.1–208.6, 222.1, 220.1, 348/335, 352, 223.1, 221.1, 360, 363
See application file for complete search history.

(56) References Cited

U.S. PATENT DOCUMENTS

| 7,239,342 | B2 * | 7/2007 | Kingetsu et al. | 348/208.4 |
| 7,675,564 | B2 * | 3/2010 | Lin | 348/335 |
| 8,120,659 | B2 * | 2/2012 | Li et al. | 348/208.4 |
| 2008/0079835 | A1 * | 4/2008 | Lin | 348/335 |
| 2008/0112644 | A1 * | 5/2008 | Yokohata et al. | 382/278 |
| 2009/0290029 | A1 * | 11/2009 | Li et al. | 348/208.4 |

FOREIGN PATENT DOCUMENTS

KR 1020100013348 A 2/2010

* cited by examiner

*Primary Examiner* — James M Hannett
*Assistant Examiner* — Ahmed A Berhan
(74) *Attorney, Agent, or Firm* — Drinker Biddle & Reath LLP

(57) ABSTRACT

A digital photographing apparatus such as a digital camera, having a retractable body tube containing a lens assembly, and a method of controlling the same. The digital camera receives an ongoing series of images, analyzes differences between images to determine an abnormal camera condition such as dropping the camera, and automatically retracts the body tube into the camera to protect it from impact.

17 Claims, 12 Drawing Sheets

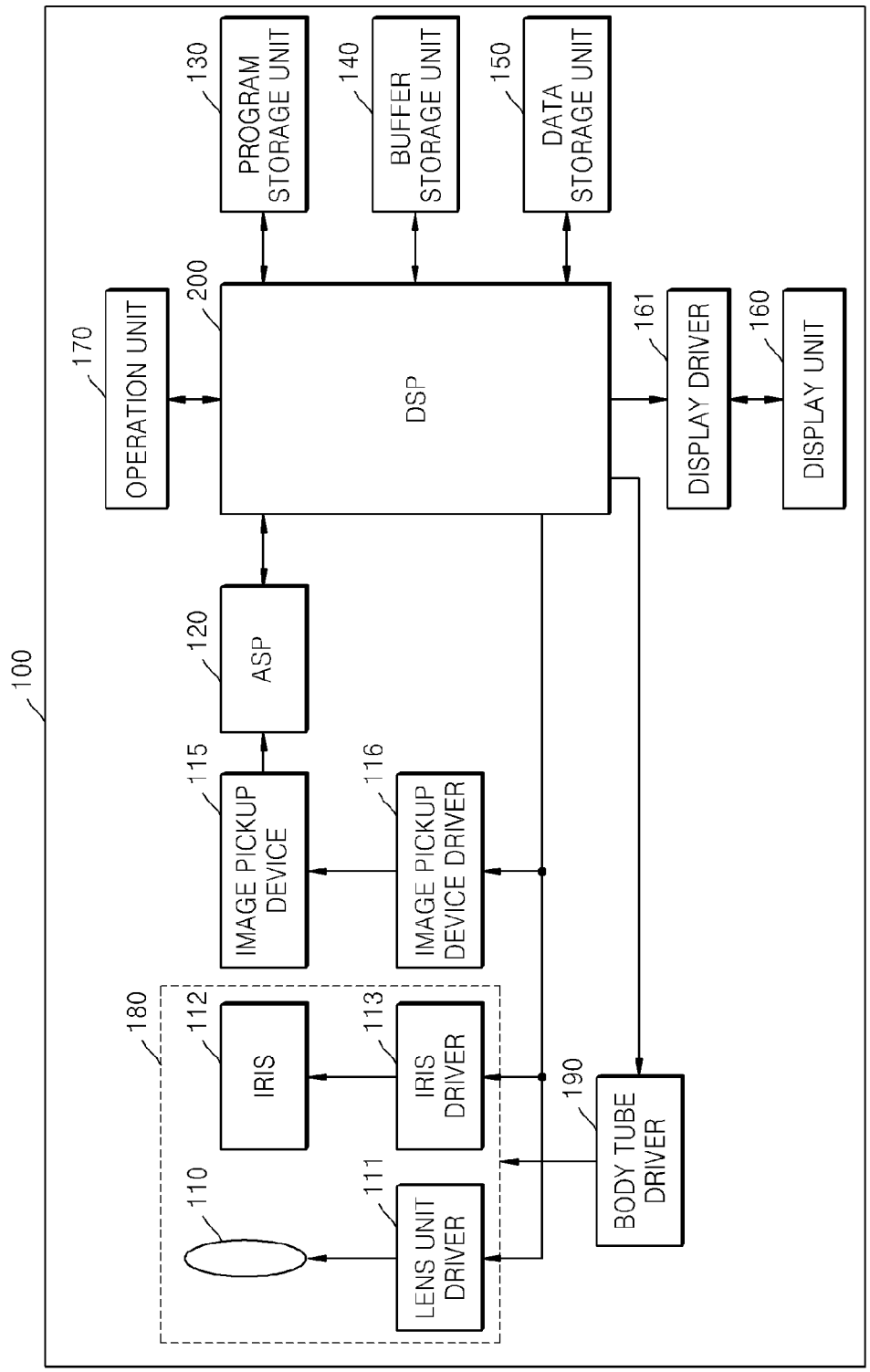

FIG. 5C
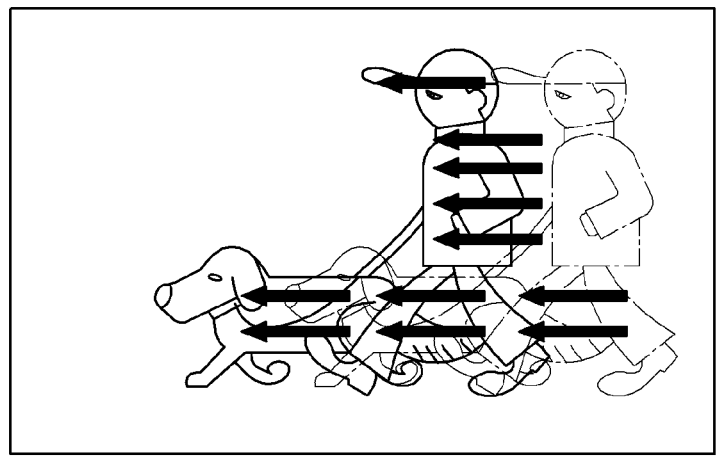
FIUG. 5D
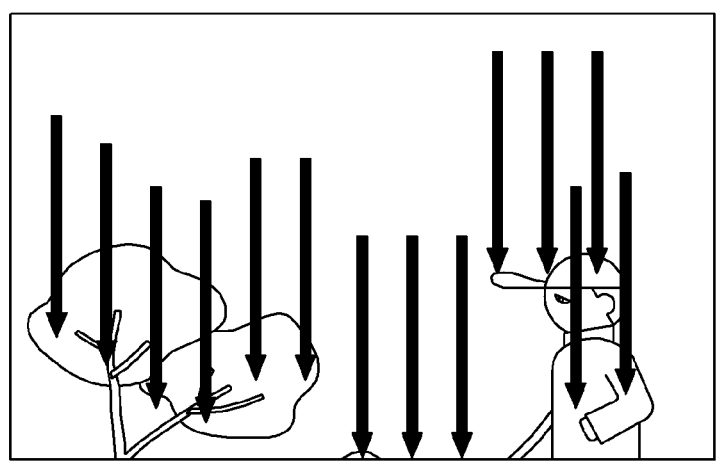

DIGITAL PHOTOGRAPHING APPARATUS AND CONTROL METHOD

CROSS-REFERENCE TO RELATED PATENT APPLICATION

This application claims the benefit of Korean Patent Application No. 10-2010-0109257, filed on Nov. 4, 2010, in the Korean Intellectual Property Office, the entirety of which is incorporated herein by reference.

BACKGROUND

1. Field of the Invention

Embodiments relate generally to a digital photographing apparatus and a method of controlling the same.

2. Description of the Related Art

Typically, a lens assembly of a digital photographing apparatus such as a camera is housed in a lens body tube. According to an ON/OFF position of a power switch in the camera, the body tube automatically moves to an extended, open position, i.e., a position where the body tube protrudes outside of the camera; or a retracted, closed position, i.e., a position where the body tube is housed within the camera. In the open position, a zooming operation may move portions of the lens assembly, and/or of the body tube itself, to a focal position according to an automatic or manual operation of a zoom switch, such as when taking a photograph. In the closed position, a photograph cannot be taken.

The body tube may move according to rotation of a motor, for example, a zoom motor. When the zoom motor rotates, a gear group linked to the zoom motor rotates, transferring the force of the zoom motor to a body tube member included in the body tube. This rotates the body tube member, thereby moving the body tube back and forth.

SUMMARY OF THE INVENTION

The herein described apparatus and methods provide for preventing damage to a body tube or a lens, even if a camera is dropped, by determining an abnormal state through an analysis of input images, and taking measures to protect the body tube.

According to an embodiment, there is provided a digital photographing apparatus including an image analyzer operable to receive on ongoing series of images, select from the series a first image and a second image, determine image characteristics of the first image and the second image, analyze differences between corresponding characteristics; and operate a body tube driving controller operable to control driving a body tube according to a result of the analysis.

The first image and the second image may be consecutive live preview images.

The image analyzer may include a motion vector comparator operable to calculate motion vectors between the first image and the second image and determine whether a magnitude of one or more of the motion vectors is equal to or greater than a threshold, and if the magnitude of the motion vectors is equal to or greater than the threshold, the body tube driving controller may output a retract body tube control signal to retract an extended body tube into the digital photographing apparatus.

The image analyzer may include an image variation comparator operable to calculate a variation between the first image and the second image and determine whether the variation is equal to or greater than a threshold. If the variation is equal to or greater than the threshold, the body tube driving controller may output a retract body tube control signal to retract an extended body tube into the digital photographing apparatus.

The image analyzer may include an Automatic Exposure (AE) comparator operable to calculate brightness values of the first image and the second image and determine whether a difference between the brightness values is equal to or greater than a threshold. If the difference between the brightness values is equal to or greater than the threshold, the body tube driving controller may output a retract body tube control signal to retract an extended body tube into the digital photographing apparatus.

The image analyzer may include an Automatic White Balance (AWB) comparator operable to calculate a color change value of the first image and the second image and determine whether the color change value is equal to or greater than a threshold, and if the color change value is equal to or greater than the threshold, the body tube driving controller may output a retract body tube control signal to retract an extended body tube into the digital photographing apparatus.

Image characteristics may include at least one of a magnitude of a motion vector, an image variation, a brightness difference, and a color change value. If at least one of the magnitude of a motion vector, the image variation, the brightness difference, and the color change value is equal to or greater than a corresponding threshold, the body tube driving controller may output a retract body tube control signal to retract an extended body tube into the digital photographing apparatus.

The body tube driving controller may output a body tube extend control signal to extend a retracted body tube from the digital photographing apparatus when a predetermined time elapses after retracting the body tube into the digital photographing apparatus.

The first image and the second image may be consecutive images among a plurality of live preview images.

According to another embodiment, there is provided a digital photographing apparatus including a frame selector operable to select a first image frame and a second image frame from an input live preview image signal; an image analyzer operable to analyze image characteristics of the first image frame and the second image frame; a body tube driving controller operable to output a body tube retract control signal to retract an extended body tube into the digital photographing apparatus according to the analyzed image characteristics; and a body tube driver operable to retract the body tube into the digital photographing apparatus according to the body tube retract control signal.

Image characteristics may include at least one of a magnitude of a motion vector, an image variation, a brightness difference, and a color change value. If at least one of the magnitude of a motion vector, the image variation, the brightness difference, and the color change value is equal to or greater than a corresponding threshold, the body tube driving controller may output the body tube retract control signal to retract an extended body tube into the digital photographing apparatus.

According to another embodiment, there is provided a method of controlling a digital photographing apparatus, the method including receiving a first image and a second image; analyzing image characteristics of the first image and the second image; and controlling driving a body tube according to a result of the analysis.

The first image and the second image may be consecutive images among a plurality of live preview images.

The analyzing may include analyzing image characteristics including at least one of a magnitude of a motion vector, an image variation, a brightness difference, and a color change value. If at least one of the magnitude of a motion vector, the image variation, the brightness difference, and the color change value is equal to or greater than a corresponding threshold, the controlling may include outputting a body tube retract control signal to retract an extended body tube into the digital photographing apparatus.

The controlling may include outputting a body tube retract control signal to retract an extended body tube into the digital photographing apparatus according to a result of the analysis.

The controlling may include outputting a body tube extend control signal to extend a retracted body tube from the digital photographing apparatus after a predetermined time elapses since retracting the body tube into the digital photographing apparatus.

The method may further including selecting the first image and the second image consecutively from among a plurality of live preview images.

According to an embodiment, a digital photographing apparatus determines an abnormal state by analyzing input images, and takes measures to protect a body tube of the photographing apparatus, thereby preventing the body tube or a lens therein from being damaged, even if the photographing apparatus is dropped.

BRIEF DESCRIPTION OF THE DRAWINGS

The above and other features and advantages of the herein disclosed apparatus and methods will become more apparent in view of exemplary embodiments described with reference to the attached drawings in which:

FIG. 1 is a block diagram of an exemplary digital camera as an example of a digital photographing apparatus according to an exemplary embodiment;

DETAILED DESCRIPTION

Figure 2A:
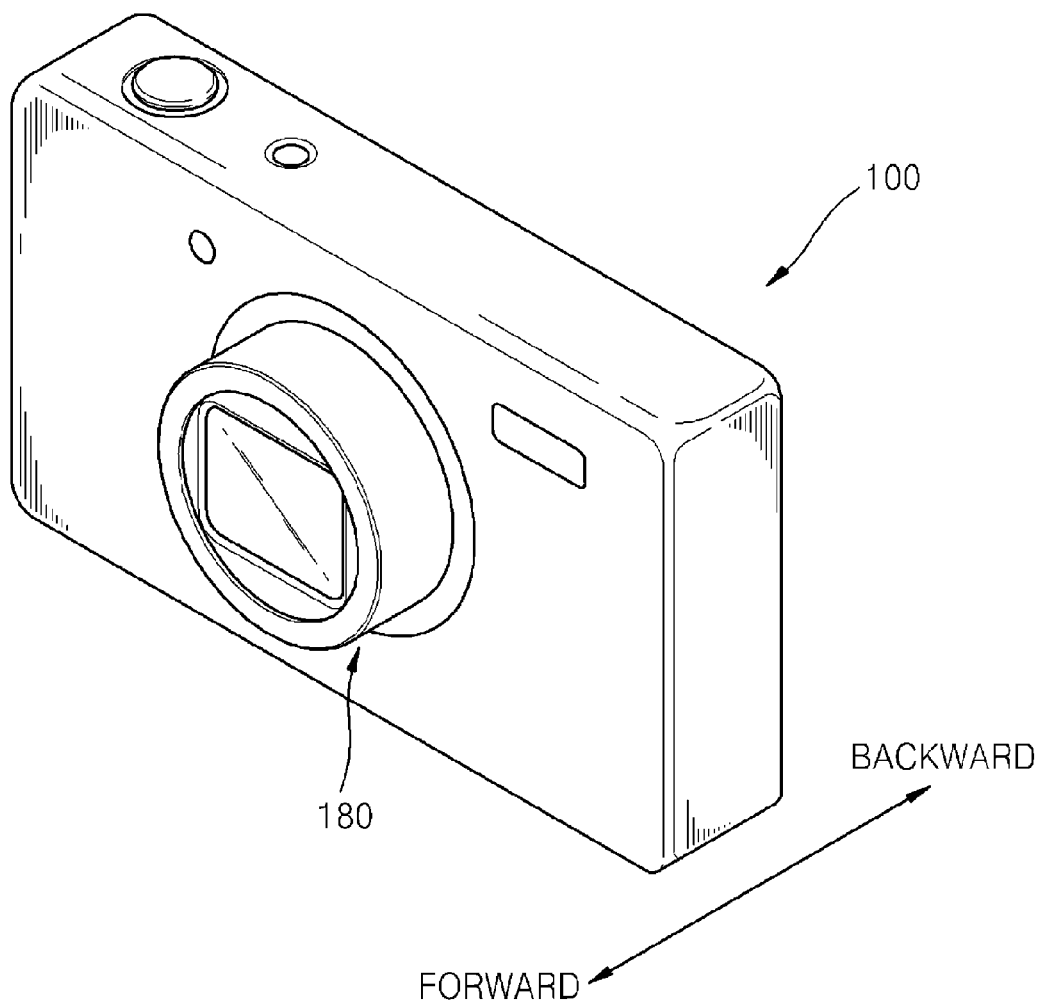
FIGS. 2A and 2B illustrate movement of a body tube of the camera of FIG. 1.

The following description and the attached drawings are provided for better understanding of the disclosed exemplary embodiments. Descriptions of techniques or structures related to the described embodiments which would be obvious to one of ordinary skill in the art may be omitted.

The specification and the drawings are provided for the purpose of illustration and not limitation. Accordingly, the scope of the invention is determined by the appended claims and their equivalents.

Though terms like "first" and "second" are used to describe various elements, the elements are not limited to these terms. These terms are used only to differentiate one element from another element.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments will now be described more fully with reference to the accompanying drawings, in which like reference numerals designate like parts. In the drawings, the thicknesses of layers and/or regions may be exaggerated for clarity.

FIG. 1 is a block diagram of an exemplary digital camera 100 as an example of a digital photographing apparatus according to an illustrative embodiment. However, the digital photographing apparatus is not limited to the digital camera 100 and may alternatively take the form of other types of digital devices, such as a camera phone, a Personal Digital Assistant (PDA), a Portable Multimedia Player (PMP), etc.

The exemplary digital camera 100 may include a lens unit 110, a lens unit driver 111, an iris 112, an iris driver 113, an image pickup device 115, an image pickup device driver 116, an analog signal processor (ASP) 120, a program storage unit 130, a buffer storage unit 140, a data storage unit 150, a display driver 161, a display unit 160, a digital signal processor (DSP) 200, and an operation unit 170. The lens unit 110, the lens unit driver 111, the iris 112, the iris driver 113, the image pickup device 115, the image pickup device driver 116, and the ASP 120 may collectively be referred to as an image pickup unit.

The lens unit 110 concentrates light. The lens unit 110 may include a zoom lens to control an viewing angle that may be narrow or wide according to a focal length, and a focus lens for focusing a subject, wherein each of the zoom lens and the focus lens may be constructed as a single lens or a group of lenses.

The iris 112 adjusts light intensity of incident light by adjusting the size of an aperture thereof.

The lens unit driver 111 and the iris driver 113 may receive control signals from the DSP 200 and drive the lens unit 110 and the iris 112, respectively, in accordance therewith. The lens unit driver 111 may adjust a focal length by adjusting a position of the lens unit 110, and may perform operations such as auto-focusing, zooming, or focus changing. The iris driver 113 may adjust a degree of opening the iris 112, and in particular, may perform operations such as auto-focusing, automatic exposure compensation, focus changing, or adjustment of depth of field, by adjusting a so-called f-number or an iris value.

The lens unit 110, the lens unit driver 111, the iris 112, and the iris driver 113 may be enclosed in a lens body tube 180. The body tube 180 may retract into a main body of the photographing apparatus, or extend from the main body, according to a driving control signal of a body tube driver 190. The body tube driver 190 may control the position of the body tube 180 according to a control signal of the DSP 200. A motor, such as a step motor, a voice coil motor, or a piezo motor for example, may be used for the body tube driver 190; and a rack-pinion system, a rotational screw structure, a straight sliding structure, a cam structure, or the like may be used as a driving system. Means to move the body tube 180 are well-known to those of skill in the art, therefore a detailed description thereof is omitted.

Figure 2B:
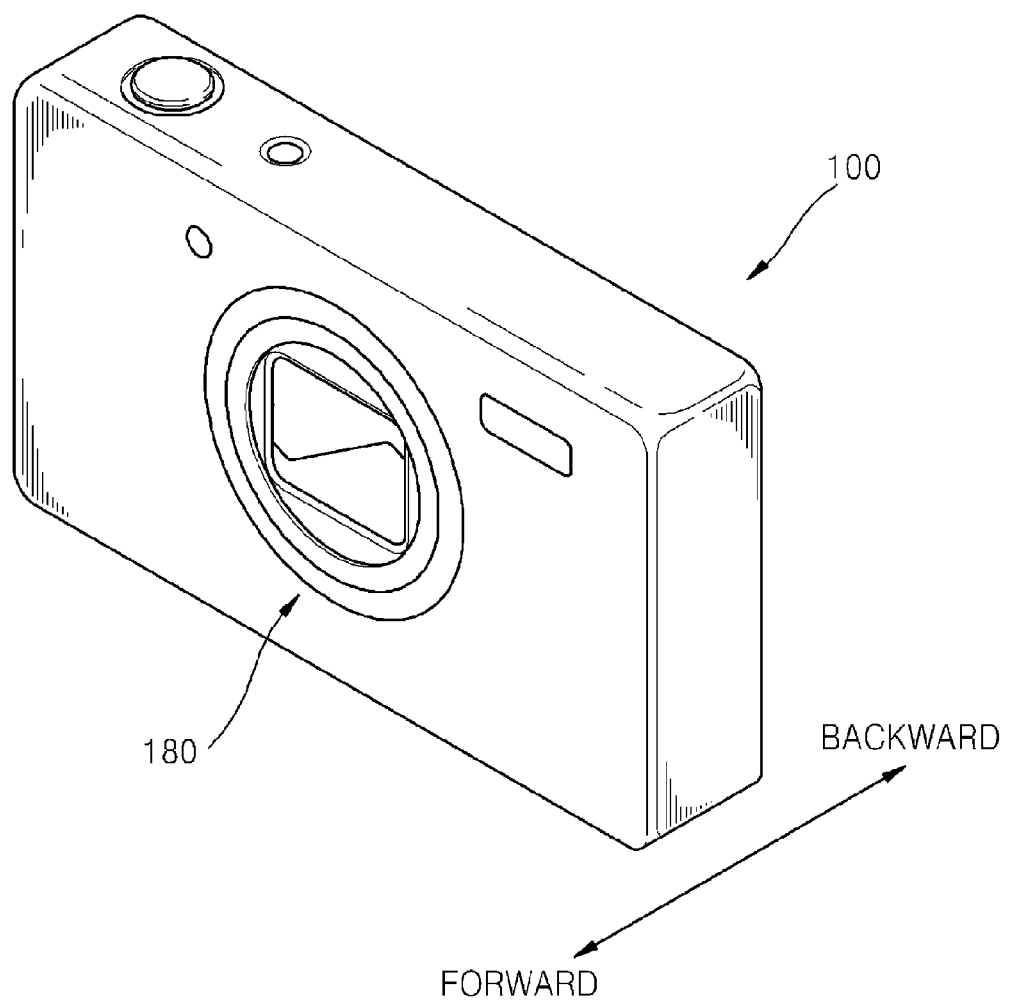

As illustrated in FIGS. 2A and 2B, when power of the digital camera 100 is turned on from off, the body tube 180 extends from the front of the camera; and when the power is turned off from on, the body tube 180 moves towards the rear and retracts into the main body. FIG. 2A shows the body tube in an extended position, and FIG. 2B shows the body tube in a retracted position. Illustratively, when an abnormal situation occurs while the digital camera 100 is engaged in a normal photographing operation or a photographing preparing operation, for example, if the digital camera 100 is dropped from a height while photographing, the body tube 180 may automatically retract into the main body of the digital camera 100 as shown in FIG. 2B, by analyzing characteristics of captured images, such as preview images, in order to prevent the body tube 180 or the lens unit 110 from being damaged by a direct impact to the body tube 180. Illustratively, the image characteristics may include one or more of a magnitude of a motion vector, an image variation, a brightness difference, or a color change value for example; and an abnormal state, such as falling from a height, may be determined by comparing the image characteristics to one or more threshold values that correspond to the characteristics. The image characteristics analysis will be described hereinafter with reference to FIGS. 2 and 3.

Light passing through the lens unit 110 reaches the image pickup device 115 to form an image of a subject on a light receiving surface of the image pickup device 115. The image pickup device 115 may use a Charge-Coupled Device (CCD), a Complementary Metal-Oxide Semiconductor Image Sensor (CIS), a high-speed image sensor, or the like, for converting the light (optical signal) to an electrical signal. Sensitivity of the image pickup device 115 may be controlled by the image pickup device driver 116. The image pickup device driver 116 may control the image pickup device 115 according to a control signal automatically generated by an image signal input in real-time, or a control signal manually input by a user.

A light-exposure time of the image pickup device 115 may be adjusted by a shutter (not shown). The shutter may include a mechanical shutter for adjusting incident light by moving a cover, and/or an electronic shutter for controlling light-exposure by providing an electrical signal to the image pickup device 115.

The ASP 120 performs functions such as noise reduction processing, gain adjustment, waveform standardization, analog-to-digital conversion of an analog signal provided from the image pickup device 115.

Through the operation unit 170, a control signal can be input by the user via one or more user interface elements operable to send signals to the operation unit 170. Such elements may include various functional buttons, for example, such as a shutter-release button for inputting a shutter-release signal to take a picture by exposing the image pickup device 115 to light for a predetermined time, a power button for inputting a control signal to turn power ON/OFF, a wide-angle zoom button and a telescopic zoom button for respectively widening an angle of view and narrowing the angle of view, a mode selection button for selecting a character input mode, a photographing mode, and a reproduction mode, a white balance setup function selection button, and an exposure setup function selection button. User interface elements are not limited to various functional buttons, and control signals may be generated by a user using one or more of a keyboard, touch pad, touch screen, remote control, dials, and the like.

The digital camera 100 may include the program storage unit 130 for storing programs, such as an operating system for driving the digital camera 100 and an application system, the buffer storage unit 140 for temporarily storing data required to perform a computation or result data, and the data storage unit 150 for storing an image file, which may include an image signal and various kinds of information required for the programs, for example.

The digital camera 100 may include the display unit 160 for displaying an operation state of the digital camera 100 and/or information regarding an image captured by the digital camera 100. The display unit 160 may provide visual information and/or auditory information to the user. To provide the visual information, the display unit 160 may include, for example, a Liquid Crystal Display (LCD) panel, or an Organic Light Emitting Diode (OLED) panel. The display driver 161 provides a driving signal to the display unit 160.

The digital camera 100 includes the DSP 200 operable to process an input image signal and control corresponding components of the digital camera 100 according to an input signal from the outside. The DSP 200 may reduce noise of input image data and perform image signal processing for image quality enhancement, such as gamma correction, color filter array interpolation, color matrix, color correction, and color enhancement. In addition, the DSP 200 may generate an image file by compressing image data generated through image signal processing for image quality enhancement, or restore image data from an image file. A compression format of an image may be a lossless format or lossy format. Examples of image formats include the Joint Photographic Experts Group (JPEG) format and the JPEG 2000 format. The compressed data may be stored in the data storage unit 150. In addition, the DSP 200 may perform functional processing, such as unclear processing, color processing, blur processing, edge emphasis processing, image analysis processing, image recognition processing, image effect processing, and the like. The image recognition processing may include face recognition processing and scene recognition processing. For example, brightness level adjustment, color correction, contrast adjustment, contour emphasis adjustment, screen division processing, creation of a character image, and image composition processing may be performed.

In addition, the DSP 200 may generate control signals for controlling Auto Focusing (AF), a zoom change, a focus change, and AE correction by executing programs stored in the program storage unit 130 or using a separate module, respectively provide the control signals to the lens unit driver 111, the iris driver 113, and the image pickup device driver 116, and generally control operations of components in the digital camera 100. In addition, the DSP 200 outputs a body tube driving control signal to the body tube driver 190 to move the body tube 180 back or forth, thereby controlling extending or retracting the body tube 180.

Figure 3:
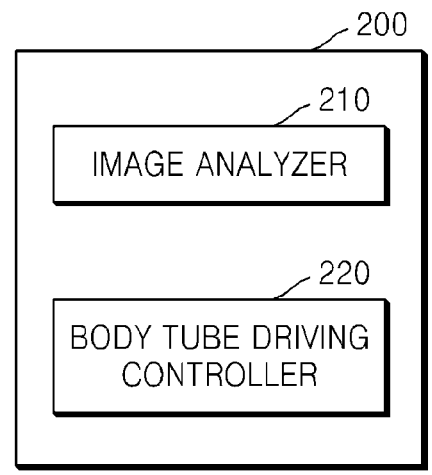
FIG. 3 is a detailed block diagram of an exemplary digital signal processor of the camera of FIG. 1.

FIG. 3 is a detailed block diagram of an exemplary DSP, such as the DSP 200 of FIG. 1. As shown, the DSP 200 includes an image analyzer 210 and a body tube driving controller 220.

The image analyzer 210 receives images processed by the ASP 120 and analyzes characteristics of the images. The images may be live preview images and the image analyzer 210 may analyze characteristics of two consecutive frame images (referred to as a first image and a second image), for example.

Figure 4:
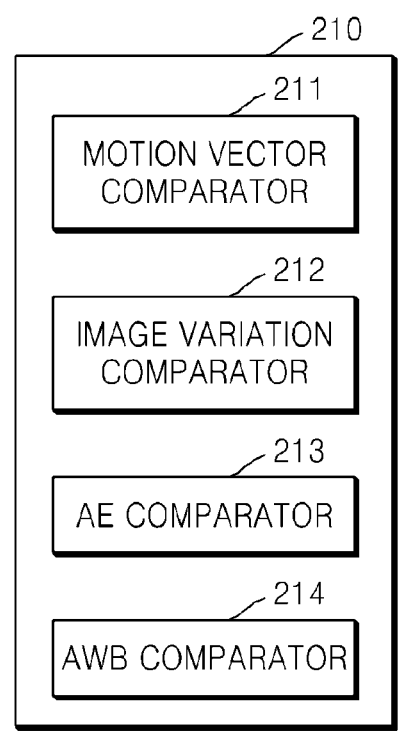
FIG. 4 is a detailed block diagram of an exemplary image analyzer of the digital signal processor of FIG. 3.

FIG. 4 is a detailed block diagram of an exemplary image analyzer, such as the image analyzer 210 of FIG. 3. The image analyzer 210 may include a motion vector comparator 211, an image variation comparator 212, an AE comparator 213, and an AWB comparator 214.

A frame selector (not shown) operable to select two frame images may also be included. The two images may be two consecutive frames. The two frame images selected by the frame selector may be provided to the image analyzer 210.

The motion vector comparator 211 calculates motion vectors between the first image and the second image and determines whether a magnitude of each of the motion vectors is equal to or greater than a threshold. That is, the motion vector comparator 211 detects the motion vectors by comparing the first image with the second image and determines whether the magnitude of each of the motion vectors is equal to or greater than the threshold. The threshold may be a selected value or an automatically determined value. Illustratively, a Pixel Recursive Algorithm (PRA) or a Block Matching Algorithm (BMA) may be used as a method of detecting motion vectors, wherein the PRA is a method of estimating a motion of every pixel in a frame, and the BMA is a method of dividing a frame of which a motion is estimated into a plurality of arbitrary small blocks and granting one motion vector to each block under assumption that all pixels in each block have the same motion. Although a motion vector per pixel or block is detected in the current embodiment, the present invention is not limited thereto.

Figure 5A:
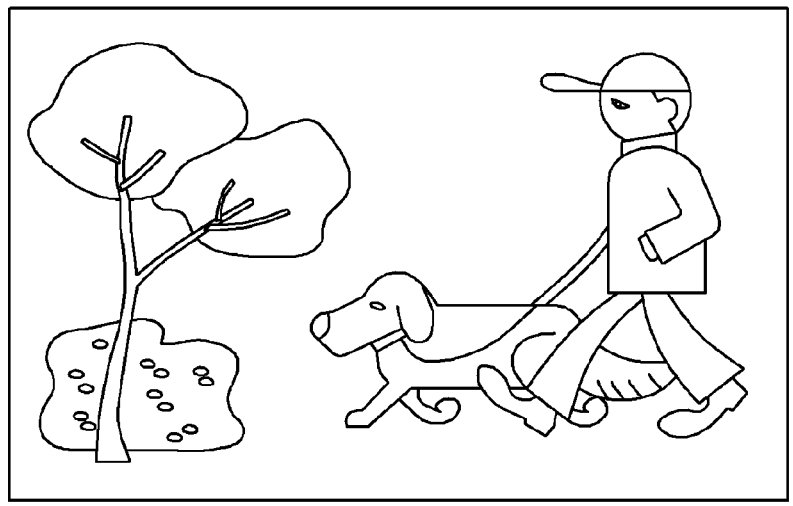
FIGS. 5 to 7 are images for use in describing an image analysis process according to another exemplary embodiment.
Figure 5B:
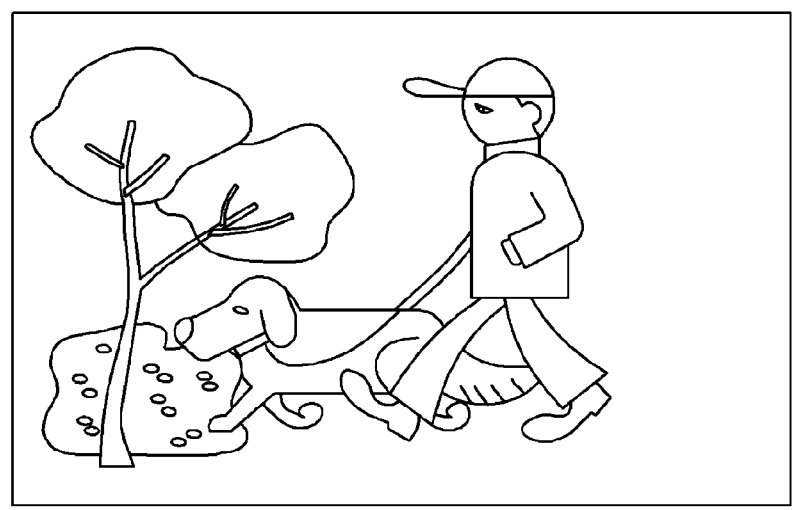

Referring to FIGS. 5A to 5D, it is determined from a first image shown in FIG. 5A and a second image shown in FIG. 5B that a main subject is moving toward the left, and exemplary motion vectors between the first image and the second image are shown in FIG. 5C. It can be determined that a magnitude of each of the motion vectors shown in FIG. 5C is within a range expected during normal operation of the digital camera 100. An alternative second image, shown in FIG. 5D, is an image acquired if the digital camera 100 is dropped. It can be determined that a magnitude of each of the motion vectors between the first image shown in FIG. 5A and the second image shown in FIG. 5D is greater than the magnitude of each of the motion vectors according to a normal subject motion, as shown in FIG. 5C. That is, the magnitude of each of the motion vectors shown in FIG. 5D is not within the range expected during normal operation of the digital camera 100. For example, it may be determined whether the magnitude of each of the motion vectors shown in FIG. 5D is equal to or greater than a threshold value. The threshold value may be a selected value, or an automatically determined value. For example, the threshold value may be a value previously determined by analyzing a magnitude of each of the motion vectors acquired in an abnormal state, such as while throwing the digital camera 100. The threshold may be set through experiments or experiences encountered while in use. The lens unit 110 or the body tube 180 may be protected by moving the body tube 180 back into the digital camera 100.

Figure 6A:
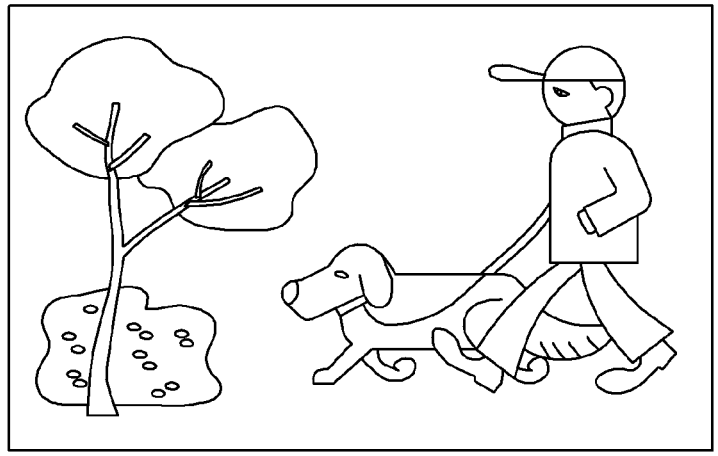
Figure 6B:
Figure 6C:
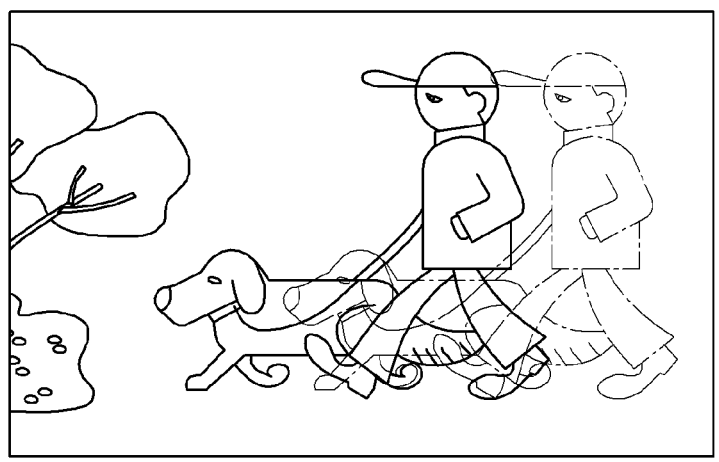
Figure 6D:
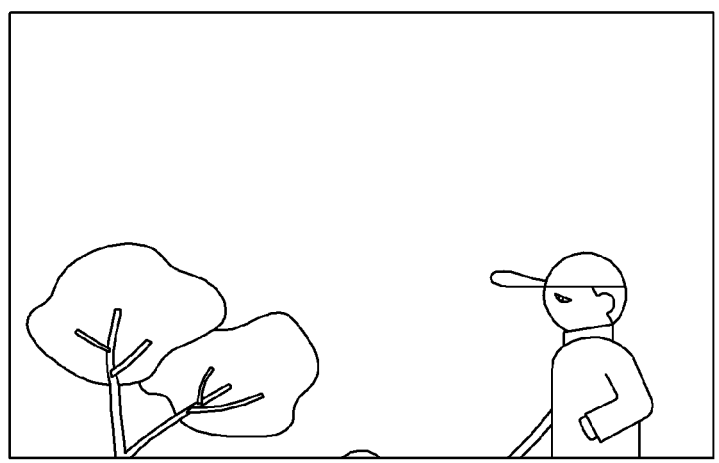

The image variation comparator 212 calculates a variation between the first image and the second image and determines whether the variation is equal to or greater than a threshold. For example, a variation of images may be a variation between consecutive images, such as the first image and the second image described previously. Illustratively, it can be determined that a first image shown in FIG. 6A and a second image shown in FIG. 6B are normal since the entire images are the same, except for a motion of a main subject as shown in FIG. 6C. However, as shown in FIG. 6D, the entire image is changed in a second image acquired during dropping or throwing the digital camera 100. That is, compared with the image shown in FIG. 6A, the subjects in the image shown in FIG. 6D have changed completely, such as a position of the main subject (human) and a secondary subject (dog) which has disappeared. Thus, it may be determined that the digital camera 100 is in an abnormal state or position, thereby causing action to protect the body tube 180 to be taken, such as retracting the body tube 180 into the digital camera 100. The threshold to which the image variation is compared may be an automatically determined value, such as a value obtained by recognizing the position, or presence, or absence of a subject, or an image change including some other difference.

The AE comparator 213 calculates brightness values of the first image and the second image and determines whether a difference between the brightness values is equal to or greater than a threshold. The brightness value may be a mean image brightness value determined by using light-measuring and/or distance-measuring from the first image and/or the second image. AE is a process of determining an iris value (F value) and a shutter speed of an imaging device such as a CCD according to a predetermined program by detecting mean brightness, i.e., luminance, of an image using light-measuring and distance-measuring and calculating an exposure value (EV) suitable for photographing. Here, the threshold may be an automatically determined value, for example, a value determined by brightness values acquired during one or more abnormal states, such as while throwing the digital camera 100. The threshold may be set using values obtained through experiments or usage experiences. The lens unit 110 or the body tube 180 may be protected by moving the body tube 180 back into the digital camera 100, although other protective measures may also be used.

Figure 7A:
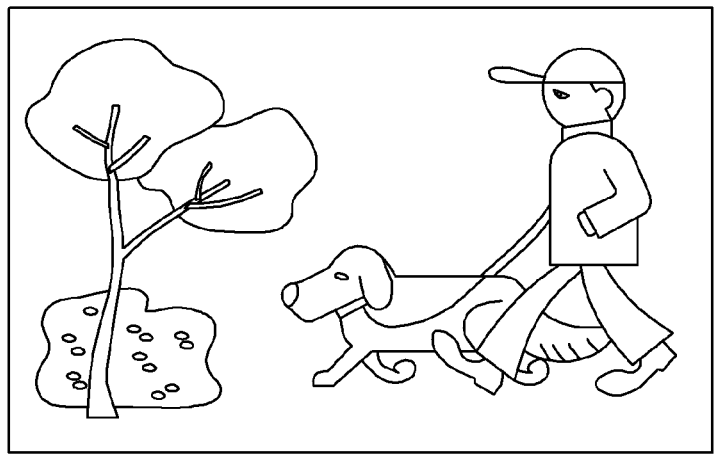
Figure 7B:
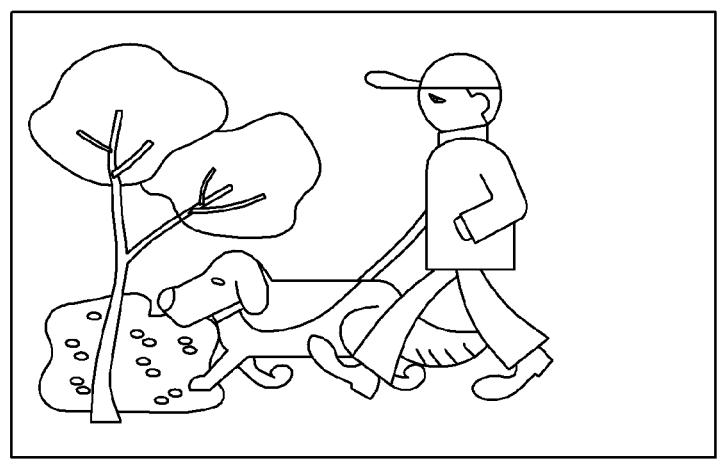

Referring now to FIGS. 7A and 7B, there is almost no brightness change between a first image shown in FIG. 7A and a second image shown in FIG. 7B, but there is motion of a main subject. However, it can be determined that an image brightness change has suddenly occurred in an image shown in FIG. 7C. That may occur, for example, when the digital camera 100 is dropped or is thrown, and the digital camera 100 faces the sky or the earth and thus an EV change occurs by the image suddenly becoming bright or dark.

The AWB comparator 214 calculates a color change between the first image and the second image and determines whether the color change is equal to or greater than a threshold. Illustratively, it may be determined based on color temperatures estimated from the first image and the second image whether the color change is equal to or greater than the threshold. That is, when a sudden color change occurs, an abnormal state of the digital camera 100 may be indicated, depending on whether the color change is equal to or greater than the threshold. That may be determined based on the color temperatures estimated from the first image and the second image. The AWB may adjust a mean color value based on an assumption that a color value of a screen is white, regardless of a change of a light source, for example. An AWB algorithm may be used to extract a point identified as a gray subject in an input image, and estimate a color temperature based on color information of the gray subject. That is, the AWB algorithm may be a process in which, once the color temperature is estimated, a color of an output image is adjusted by multiplying an RGB channel by a proper gain to correct the estimated color temperature.

Figure 7C:
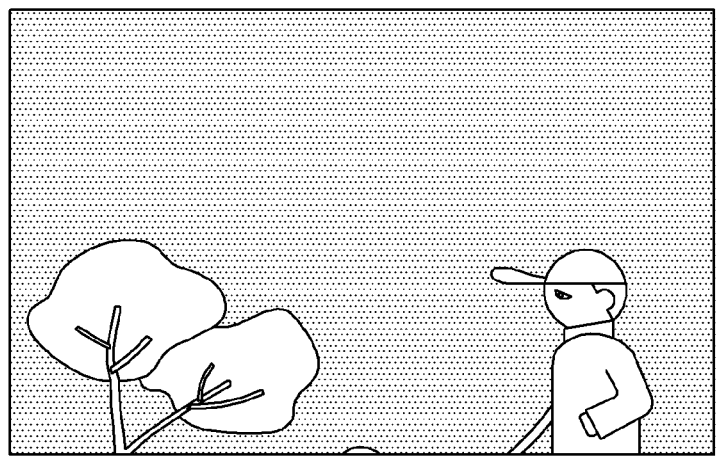

Referring to the image shown in FIG. 7C, if the digital camera 100 faces the sky or the earth when dropped or thrown, a color of the image is suddenly changed, thereby changing a color temperature estimated in an AWB process. Thus, an abnormal state may be determined by comparing the color temperature value with a threshold. The threshold may be an automatically determined value, for example, value acquired by accumulating color temperature values during abnormal states, or during throwing the digital camera 100. The threshold may be determined through experiments or usage experiences. Once the threshold is set, the lens unit 110 and/or the body tube 180 may be protected when such an abnormal state is detected, such as by moving the body tube 180 into the digital camera 100.

In an embodiment, the body tube controller 220 generates a body tube driving control signal for controlling driving of the body tube 180 according to a result of the analysis of the image analyzer 210 and outputs the body tube driving control signal to the body tube driver 190 shown in FIG. 1. Illustratively, the body tube driving control signal may include a control signal for retracting the body tube 180, i.e., a control signal for moving the body tube 180 backwards, and a control signal for extending the body tube 180, i.e., a control signal for moving the body tube 180 forwards.

In addition, the body tube controller 220 may output a body tube extension control signal for extending the body tube 180 when a predetermined time elapses after retracting the body tube 180. Thus, after an abnormal state ends, the body tube 180 may automatically be returned to its previous state, e.g., an extended state ready for photographing, thereby increasing user convenience.

Figure 8:
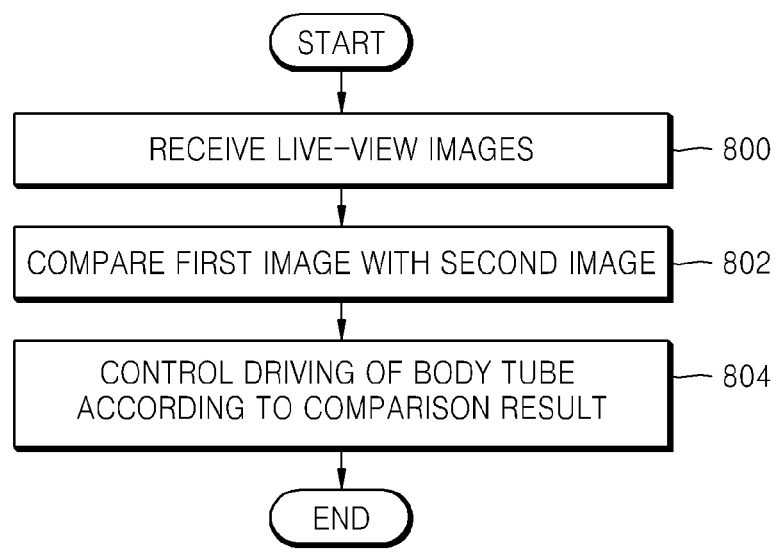
FIG. 8 is a flowchart of a method of controlling a digital photographing apparatus, according to an exemplary embodiment.

FIG. 8 is a flowchart of a method of controlling a digital photographing apparatus, according to another exemplary embodiment. Referring to FIG. 8, live-view images are received, 800. A first image is compared with a second image, 802. Illustratively, the first image and the second image may be consecutive live-view images. Driving of a body tube is controlled according to a result of the comparison, 804. That is, if a magnitude of a motion vector, an image variation, a brightness difference, and/or a color change value of the first image and the second image is equal to or greater than a corresponding threshold as described previously, the body tube may be controlled to move back into the digital photographing apparatus. Thus, in an abnormal state, e.g., in a state of dropping a camera, a body tube and/or a lens enclosed in the body tube can be protected to prevent them from being damaged due to the camera being dropped to the ground.

Figure 9:
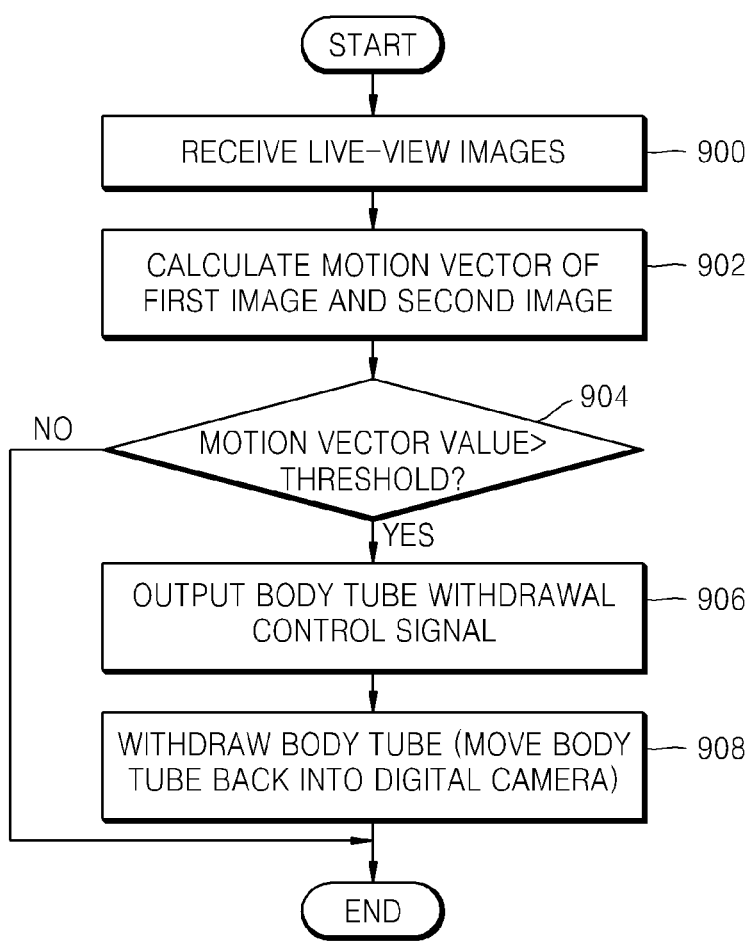
FIG. 9 is a flowchart of a method of controlling a digital photographing apparatus, according to another exemplary embodiment.

FIG. 9 is a flowchart of a method of controlling a digital photographing apparatus, according to another exemplary embodiment. Live-view images are received, 900. A motion vector between a first image and a second image is calculated, 902. It is determined whether a magnitude of the motion vector is equal to or greater than a threshold, 904. If it is determined that the magnitude of the motion vector is equal to or greater than the threshold, a retract body tube control signal is output, 906. The body tube responds to the control signal by retracting into the digital photographing apparatus, 908. Illustratively, steps 901 to 904 determine an abnormal state based on a magnitude of a motion vector. However, the present invention is not limited thereto, and other determinations may be used to indicate an abnormal state. For example, an image variation, a brightness difference, a color change value, or the like, may be used instead of or in addition to a magnitude of a motion vector.

Figure 10:
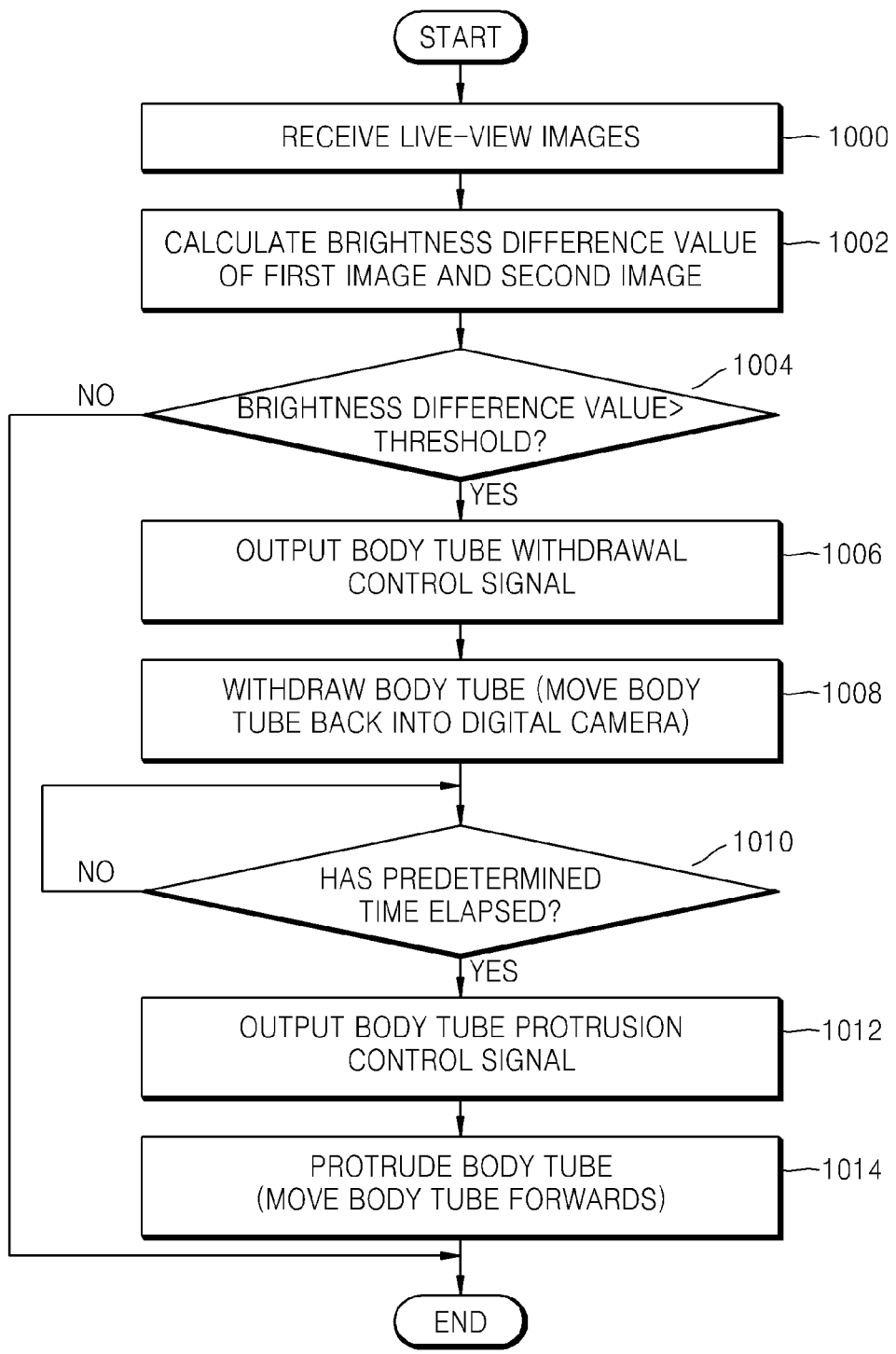
FIG. 10 is a flowchart of a method of controlling a digital photographing apparatus, according to another exemplary embodiment.

FIG. 10 is a flowchart of a method of controlling a digital photographing apparatus, according to another exemplary embodiment. In FIG. 10, live-view images are received, 1000. A brightness difference value between a first image and a second image is calculated, 1002. It is determined whether the brightness difference value is equal to or greater than a threshold, 1004. If it is determined that the brightness difference value is equal to or greater than the threshold, a body tube withdrawal control signal is output, 1006, and a body tube retracts into the digital photographing apparatus, 1008.

Thereafter, it may be determined whether a predetermined time has elapsed, 1010. If the predetermined time has elapsed, an extend body tube control signal is output, 1012, and the body tube is extended, 1014. Illustratively, after the body tube retracts into the digital photographing apparatus due to the occurrence of an abnormal state while receiving live-view images, if the abnormal state ends the body tube may be automatically extended to receive live-view images, thereby returning to a normal state.

In the illustrative embodiments described herein, image analysis is performed using live-view (i.e., preview) images, and a body tube protection process is performed according to a result of the image analysis. However, the present invention is not limited thereto. For example, embodiments can use moving images being captured, and/or protection of other parts may be performed instead of or in addition to protection of a body tube.

In addition, a magnitude of a motion vector, an image variation, a brightness difference, or a color change value have been described as examples of the image analysis. However, the present invention is not limited thereto, and other image analysis methods for determining a sudden change of images may also, or alternatively, be applied.

In addition, it has been described that a body tube is protected through analysis of images. However, the present invention is not limited thereto, and protection may be provided by determining an abnormal position and/or state of a camera through hardware, such as an accelerometer or other sensor(s).

All references in the foregoing description, if any, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to certain embodiments illustrated in the drawings, and specific language has been used to describe these embodiments. However, no limitation of the scope of the invention is intended by these embodiments or this specific language, and the invention should be construed to encompass all embodiments that would normally occur to one of ordinary skill in the art in view of this disclosure. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable medium such as a semiconductor memory, random-access memory (RAM), read-only memory (ROM), CD-ROMs, DVDs, magnetic tapes, hard disks, floppy disks, and optical data storage devices. The computer readable media may also be distributed over network coupled computer systems so that the computer readable code is stored and executed in a distributed fashion. This media can be read by the computer, stored in the memory, and executed by the processor.

Also, using the disclosure herein, programmers of ordinary skill in the art to which the invention pertains may implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various methods being implemented with any combination of data structures, objects, processes, routines or other programming elements. Functional aspects may be implemented using algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development, and other functional aspects of the herein described systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all embodiments within the scope of the claims will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of any ranges of values herein are merely intended to serve as a shorthand method of referring individually to each separate value falling within the range, unless otherwise indicated herein, and each separate value is incorporated into the specification as if it were individually recited herein.

What is claimed is:

1. An image analyzer operable to receive a first image and a second image and analyze image characteristics of the first image and the second image;
    a body tube driving controller operable to control driving a body tube according to a result of the analysis;
    wherein the image analyzer comprises a motion vector comparator operable to calculate motion vectors between the first image and the second image and determine whether a magnitude of one or more of the motion vectors is equal to or greater than a threshold;
    if the magnitude of the one or more motion vectors is equal to or greater than the threshold, the body tube driving controller outputs a retract body tube control signal to move the body tube into the digital photographing apparatus; and
    when a predetermined time elapses after moving the body tube into the digital photographing apparatus, the body tube driving controller outputs a body tube extend control signal to move the body tube from within the digital photographing apparatus.

2. The digital photographing apparatus of claim 1, wherein the first image and the second image are live-view images.

3. The digital photographing apparatus of claim 1, wherein the image analyzer comprises an image variation comparator operable to calculate a variation between the first image and the second image and determine whether the variation is more than a threshold, and
    if the variation is equal to or greater than the threshold, the body tube driving controller outputs a retract body tube control signal to move the body tube into the digital photographing apparatus.

4. The digital photographing apparatus of claim 1, wherein the image analyzer comprises an Automatic Exposure (AE) comparator operable to calculate a brightness value of the first image and the second image and determine whether a difference between the brightness values is more than a threshold, and
    if the difference between the brightness values is more than the threshold, the body tube driving controller outputs a retract body tube control signal to move the body tube into the digital photographing apparatus.

5. The digital photographing apparatus of claim 1, wherein the image analyzer comprises an Automatic White Balance (AWB) comparator operable to calculate a color change value between the first image and the second image and determine whether the color change value is more than a threshold, and
    if the color change value is more than the threshold, the body tube driving controller outputs a retract body tube control signal to move the body tube into the digital photographing apparatus.

6. The digital photographing apparatus of claim 1, wherein the image characteristics comprise at least one of a magnitude of a motion vector, an image variation, a brightness difference, and a color change value.

7. The digital photographing apparatus of claim 6, wherein, if at least one of the magnitude of a motion vector, the image variation, the brightness difference, and the color change value is more than a corresponding threshold, the body tube driving controller outputs a retract body tube control signal to move the body tube into the digital photographing apparatus.

8. The digital photographing apparatus of claim 1, wherein the first image and the second image are consecutive images among a plurality of live-view images.

9. A digital photographing apparatus comprising:
- a frame selector operable to select a first image frame and a second image frame from a continuously moving live-view image or from a plurality of stationary live-view images;
- an image analyzer operable to analyze at least one image characteristic of the first image frame and the second image frame;
- a body tube driving controller for outputting a retract body tube control signal to move the body tube into the digital photographing apparatus from an extended condition according to a result of the image characteristic analysis; and
- a body tube driver operable to move the body tube into the digital photographing apparatus from an extended condition according to the retract body tube control signal;
- wherein the image analyzer comprises a motion vector comparator operable to calculate motion vectors between the first image and the second image and determine whether a magnitude of one or more of the motion vectors is equal to or greater than a threshold;
- if the magnitude of the one or more motion vectors is equal to or greater than the threshold, the body tube driving controller outputs a retract body tube control signal to move the body tube into the digital photographing apparatus; and
- when a predetermined time elapses after moving the body tube into the digital photographing apparatus, the body tube driving controller outputs a body tube extend control signal to move the body tube from within the digital photographing apparatus.

10. The digital photographing apparatus of claim 9, wherein the image characteristics comprise at least one of a magnitude of a motion vector, an image variation, a brightness difference, and a color change value.

11. The digital photographing apparatus of claim 10, wherein, if at least one of the image variation, the brightness difference, and the color change value is more than a corresponding threshold, the body tube driving controller outputs the retract body tube control signal to move the body tube into the digital photographing apparatus from an extended condition.

12. A method of controlling a digital photographing apparatus, the method comprising: receiving a first image and a second image;
- analyzing at least one image characteristic of the first image and the second image;
- controlling driving a body tube according to a result of the analysis;
- calculating motion vectors between the first image and the second image;
- determining whether a magnitude of one or more of the motion vectors is equal to or greater than a threshold;
- if the magnitude of the one or more motion vectors is equal to or greater than the threshold, retracting the body tube into the digital photographing apparatus and
- wherein when a predetermined time elapses after retracting the body tube into the digital photographing apparatus, the controlling comprises outputting an extend body tube control signal to move the body tube forth from within the digital photographing apparatus.

13. The method of claim 12, wherein the first image and the second image are consecutive images among a plurality of live-view images.

14. The method of claim 12, wherein the analyzing comprises analyzing image characteristics including at least one of a magnitude of a motion vector, an image variation, a brightness difference, and a color change value.

15. The method of claim 14, wherein, if at least one of the image variation, the brightness difference, and the color change value is more than a corresponding threshold, the controlling comprises outputting a retract body tube control signal to move the body tube into the digital photographing apparatus.

16. The method of claim 14, wherein the controlling comprises controlling moving the body tube into the digital photographing apparatus according to a result of the analysis.

17. The method of claim 12, further comprising selecting the first image and the second image from among a plurality of consecutive live-view images.

* * * * *

UNITED STATES PATENT AND TRADEMARK OFFICE
CERTIFICATE OF CORRECTION

PATENT NO.         : 8,599,300 B2                                              Page 1 of 1
APPLICATION NO.    : 13/238704
DATED              : December 3, 2013
INVENTOR(S)        : Byeong-chan Park, Hyun-sik Yu and Sang-ryoon Son It is certified that error appears in the above-identified patent and that said Letters Patent is hereby corrected as shown below:

IN THE CLAIMS:

In Claim 1, Column 12, line 2, replace "An image analyzer" with -- A digital photographing apparatus comprising: an image analyzer --

Signed and Sealed this
Seventh Day of October, 2014

Michelle K. Lee
*Deputy Director of the United States Patent and Trademark Office*